United States Patent [19]

Armitage

[11] Patent Number: 4,618,217
[45] Date of Patent: Oct. 21, 1986

[54] ELECTRON-BOMBARDED SILICON SPATIAL LIGHT MODULATOR

[75] Inventor: David Armitage, Los Altos, Calif.

[73] Assignee: The United States of America as represented by the Secretary of the Air Force, Washington, D.C.

[21] Appl. No.: 689,681

[22] Filed: Jan. 8, 1985

[51] Int. Cl.[4] .......................... G02F 1/03; H01V 31/50
[52] U.S. Cl. .............................. 350/355; 250/213 VT; 313/524; 350/393
[58] Field of Search ....................... 350/342, 355–356, 350/393, 293; 250/213 VT; 313/524

[56] References Cited

U.S. PATENT DOCUMENTS

| | | | |
|---|---|---|---|
| 3,851,206 | 11/1974 | Hansen | 313/524 |
| 3,872,451 | 3/1975 | McNaney | 340/173 LM |
| 3,959,784 | 5/1976 | Meier | 340/173 LM |
| 3,971,931 | 7/1976 | Jehle | 350/342 |
| 3,986,175 | 10/1976 | McNaney | 340/173 LT |
| 4,032,954 | 6/1977 | Grinberg et al. | 350/342 |
| 4,432,071 | 2/1984 | Szabo | 365/124 |
| 4,481,531 | 11/1984 | Warde et al. | 350/342 |

FOREIGN PATENT DOCUMENTS 1102936  2/1968  United Kingdom ................. 350/393

OTHER PUBLICATIONS

"A Fast Silicon Photoconductor–Based Liquid Crystal Light Valve", P. O. Braatz, K. Chow, U. Efron, J. Grinberg and M. J. Little, IEEE International Electron Devices Meeting, pp. 540–543, 1979.
"A First–Order Model of a Photo-Activated Liquid Crystal Light Valve", J. D. Michaelson, SPIE, vol. 218, Devices and Systems for Optical Signal Processing, 1980.
"Silicon Liquid Crystal Light Valves: Status and Issues", U. Efron, P. O. Braatz, M. J. Little, R. N. Schwartz and J. Grinberg, Proc., SPIE, vol. 388, Jan. 1983.
"Oblique-Cut LiN$_b$O$_3$ Microchannel Spatial Light Modulator", C. Warde and J. I. Thakara, Optics Letters, vol. 7, No. 7, Jul. 1982.
"LiNbO$_3$ and LiTaO$_3$ Microchannel Spatial Light Modulators", C. Warde, A. M. Weiss and A. D. Fisher, SPIE, vol. 218, Devices and Systems for Optical Signal Processing, 1980.
"Electron-Bombarded Semiconductor Devices", David J. Bates, et al., Electron and Electron Physics, vol. 44, 1977, pp. 221–281.
"Determination of Kilovolt Electron Energy Dissipation vs. Penetration Distance in Solid Materials" by T. E. Everhart, Journal of Applied Physics, vol. 42, No. 13, Dec. 1971.
"Interpretation of Range Measurement for Kilovolt Electronics in Solids", H. Kanter et al, Physics Review, vol. 126, No. 2, Apr. 1962.

*Primary Examiner*—William H. Punter
*Attorney, Agent, or Firm*—Donald J. Singer; Richard J. Donahue

[57] ABSTRACT

An electron bombarded silicon spatial light modulator in which electrons leaving a microchannel plate amplifier are accelerated to penetrate a silicon photodiode forming electron-hole pairs therein and resulting in significant current gains.

5 Claims, 1 Drawing Figure

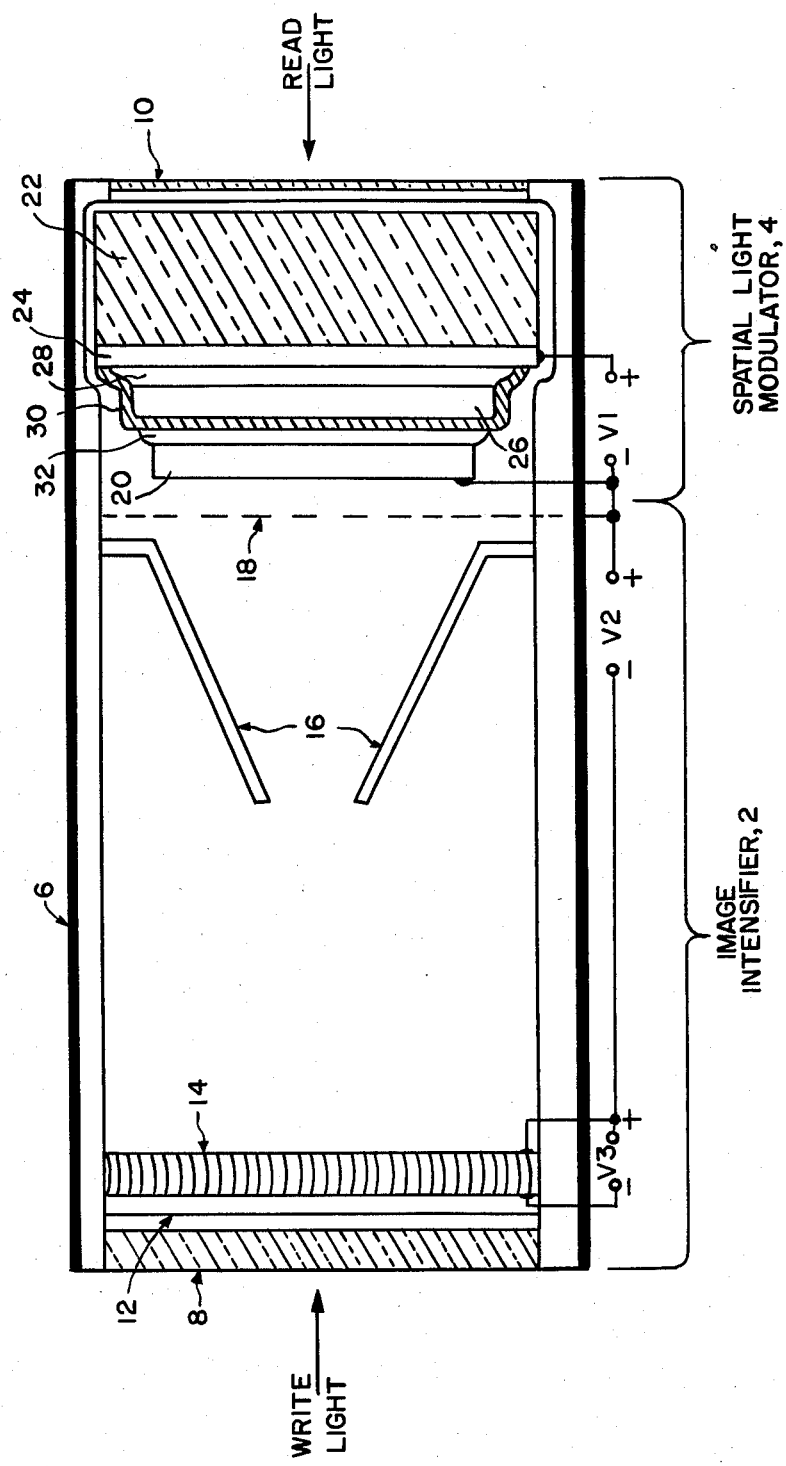

ELECTRON-BOMBARDED SILICON SPATIAL LIGHT MODULATOR

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to the field of optical signal processing apparatus, and more specifically to a spatial light modulator of improved performance.

Two-dimensional spatial light modulators are devices which allow control of an optical wavefront for processing or imaging operations. These devices, often referred to as light valves in the literature, have potential for application in large screen display systems as well as in optical data processing systems, missile guidance systems and robotic vision systems. They may also be used for performing holographic phase conjugation. Listed below are several articles which describe their construction and operation.

1. "A Fast Silicon Photoconductor-Based Liquid Crystal Light Valve", P. O. Braatz, K. Chow, U. Efron, J. Grinberg and M. J. Little, IEEE International Electron Devices Meeting, pp 540–543, 1979.
2. "Oblique-cut $LiN_bO_3$ Microchannel Spatial Light Modulator", C. Warde and J. I. Thakara, Optics Letters, Vol. 7, No. 7, July 1982.
3. "A First-Order Model of a Photo-Activated Liquid Crystal Light Valve", J. D. Michaelson, SPIE Vol. 218, Devices and Systems For Optical Signal Processing, 1980.
4. "$LiNbO_3$ and $LiTaO_3$ Microchannel Spatial Light Modulators", C. Warde, A. M. Weiss and A. D. Fisher, SPIE Vol 218, Devices and Systems for Optical Signal Processing, 1980.
5. "Silicon Liquid Crystal Light Valves: Status and Issues", U. Efron, P. O. Braatz, M. J. Little, R. N. Schwartz and J. Grinberg, Proc. SPIE Vol. 388, January 1983.

Basically, spatial light modulators comprise a photosensitive semiconductor substrate or wafer, a light blocking layer, a dielectric mirror and an electro-optic crystal (which may be a liquid crystal), arranged in a sandwich-like composite structure, and having a voltage applied thereacross. A control (write) illumination impinges on the face of the photosensitive semiconductor while an output (read) illumination makes a double pass through the electro-optic crystal.

The photosensitive semiconductor responds to intensity variations in the control illumination impinging thereon. In the dark, most of the voltage applied across the composite structure appears across the reverse-biased photodiode. The write beam, however, excites carriers in the silicon, which are driven by the internal field to the Si/electro-optic crystal interface. The voltage across the silicon decreases, while the voltage across the electro-optic crystal increases. The read illumination passes through the electro-optic crystal, is reflected off of the dielectric mirror, and again passes through the electro-optic crystal before emerging from the device. Since the diffraction efficiency of the electro-optic crystal is a function of the voltage applied thereacross, (which is a function of the intensity of the write illumination), optical control of the output (read) illumination is achieved.

One of the problems encountered in the practical implementation of such spatial light modulators is that their writing speed is limited by the intensity of the input light. The operational speed of such devices has been somewhat improved in a device called the microchannel spatial light modulator. It consists of a photocathode and a microchannel plate multiplier in proximity focus with an optional planar acceleration grid and an electro-optic crystal plate. The electro-optic plate carries a high-resistivity dielectric mirror on its side nearest the microchannel plate multiplier. Incoherent or coherent light incident upon the photocathode produce charge which is amplified by the microchannel plate multiplier and is proximity focused onto the mirror surface, to modulate the refractive index of the electro-optic crystal. The image is erased by flooding the photocathode with light to remove electrons from the mirror surface by secondary electron emission. Alternatively, the image is written by secondary electron emission and erased by adding electrons to the electro-optic crystal. Such a device, which exploits the secondary electron emission characteristics of the dielectric mirror, is described in the article entitled "Oblique-cut $LiNbO_3$ Microchannel Spatial Light Modulator", supra.

The additional amplification achieved by secondary emission at the surface of the dielectric mirror improves somewhat the speed of operation of such devices, perhaps by an order of magnitude or less. However, further improvements in operational speed and other performance characteristics cannot be obtained once the saturation current of the microchannel plate multiplier is reached. Furthermore, at high current outputs, the temperature of such microchannel plate multipliers increases to a value where their operational lifetime is drastically reduced.

SUMMARY OF THE INVENTION

It is therefore the general object of the present invention to provide a spatial light modulator having novel construction and improved performance and operational speed capability.

Briefly, in the spatial light modulator device of the present invention, the output of a microchannel plate amplifier is used to electron bombard a reverse biased silicon photodiode so as to convert high energy electrons into electron-hole carriers in the photodiode. Current gains in the order of 1000 are readily attained.

BRIEF DESCRIPTION OF THE DRAWINGS

This invention together with its objects, features and advantages may be better understood from the following detailed description when read in conjunction with the drawing, in which:

The sole FIGURE in the drawing is a schematic diagram of an electron-bombarded spatial light modulator constructed in accordance with a specific embodiment of the invention.

DETAILED DESCRIPTION OF THE INVENTION

FIG. 1 is a schematic diagram depicting the side view of the electron-bombarded spatial light modulator of the present invention. The various components thereof have not been drawn to scale in view of the large differences in their thicknesses. Representative thickness values are provided herein to facilitate an understanding of the invention.

The electron bombarded spatial light modulator of the present invention is basically comprised of an image intensifier 2 (of conventional design but without a phosphor screen) and a spatial light modulator 4 housed within an evacuated chamber in the form of a tube 6 having the ends thereof enclosed by windows 8 and 10.

Image intensifier 2 includes a photocathode 12 for converting photons to electrons, a microchannel plate multiplier 14 for multiplying the incident photoelectron flux and thus provide some gain, and may include an accelerating grid 18. Image intensifier 2 may be of the proximity focus type or may include either electromagnetic focusing means or electrostatic focusing means, also known in the art. (A pair of focusing electrodes 16 are shown in the drawing to illustrate their relative position within the tube 6, when electrostatic focusing is used.)

Instead of having a phosphor screen behind a thin opaque metallic shield, which commonly functions as the anode of an image intensifier tube, the screen is replaced by accelerating electrode 18, and electrons are caused to impinge on the silicon photodiode 20 of spatial light modulator 4.

Spatial light modulator 4 further includes a transparent substrate 22 having a transparent electrode 24 formed on one surface thereof. An electro-optic crystal 26 is affixed to transparent electrode 24 by an optical bonding material 28. A dielectric mirror 30 is focused over electro-optic crystal 26 and the silicon photodiode 20 is affixed thereto by optical bonding material 32.

Photodiode 20 is preferably comprised of silicon material having p-type material diffused in the surface thereof nearest the image intensifier 2. An electrical contact is formed on the p-type silicon and a voltage V1 is applied between the p-type material and transparent electrode 24 to reverse bias the photodiode 20. A high voltage V2, in the order of 10 kilovolts, is applied between the microchannel plate multiplier 14 and both the accelerating electrode 18 (when used) and the p-type material in photodiode 20. A voltage V3 is also applied across microchannel plate multiplier 14 for operation thereof.

Electro-optical crystal and photodiode 20 may have thicknesses in the order of 100 micrometers (microns) while dielectric mirror 30 and optical bonding materials 28 and 32 may be in the order of a micron in thickness. Transparent substrate 22 may have a thickness of 15 millimeters.

In operation, a write illumination is received by photoemissive element 12 which emits electrons representative thereof. The electrons are received by microchannel plate multiplier 14 which provides an increased number of electrons. Electrons leaving microchannel plate multiplier 14 are accelerated to a potential V2. Electron collision processes occur in the silicon photodiode 20 creating electron-hole pairs. The carriers are separated and swept across the silicon photodiode 20 by potential V1, as in a conventional photoactivated silicon device.

A detailed discussion of the theory of operation of electron bombarded semiconductor devices is provided in the article entitled "Electron-Bombarded Semiconductor Devices" by David J. Bates, Richard J. Knight, Salvatore Spinella and Aris Silzaro, which appears on pages 221-281 of the text entitled "Electron and Electron Physics, Vol. 44, 1977. Here, it is stated that each 12 keV incident beam electron can produce thousands of carrier pairs in a silicon diode, resulting in current amplification in the semiconductor of 2000 or more. The voltage established across electro-optic crystal 26 by the carriers swept across the silicon photodiode 20 changes the diffraction efficiency of electro-optic crystal 26 to effect the read illumination passing therethrough and optically control the read illumination.

Although the invention has been described with reference to a particular embodiment, it will be understood to those skilled in the art that the invention is capable of a variety of alternative embodiments within the spirit and scope of the appended claims.

What is claimed is:

1. An electron-bombarded silicon spatial light modulator comprising:
    an evacuated chamber having an image intensifier and a spatial light modulator enclosed therein;
    said image intensifier including
        a photoemissive element for receiving a write illumination and emitting electrons representative of said write illumination, and
        a microchannel plate multiplier receiving said electrons and providing an increased number of said electrons,
    said spatial light modulator including
        a silicon substrate having a first surface and an opposed second surface, said first surface of said silicon substrate having p-type material diffused therein to form a photodiode,
        a dielectric mirror having a first surface and an opposed second surface, said first surface of said dielectric mirror being adjacent said second surface of said silicon substrate,
        an electro-optic crystal having a first surface and an opposed second surface, said first surface of said electro-optic crystal being adjacent said second surface of said dielectric mirror,
        a transparent electrode having a first surface and an opposed second surface, said first surface of said transparent electrode being adjacent said second surface of said electro-optical crystal, and
        a transparent supporting substrate having a first surface and an opposed second surface, said first surface of said transparent supporting substrate being adjacent said second surface of said transparent electrode,
    means for applying a first voltage between said p-type silicon material and said transparent electrode to reverse bias said photodiode; and
    means for applying a second voltage between said microchannel plate multiplier and said p-type silicon material whereby said increased number of said electrons are accelerated towards said p-type silicon material to strike said p-type silicon material with sufficient energy to form electron-hole pair combinations within said silicon substrate.

2. Apparatus as defined in claim 1 wherein said image intensifier further comprises:
    accelerating electrode means for aiding in the acceleration of said secondary electrons through said chamber towards said spatial light modulator.

3. Apparatus as defined in claim 2 wherein said accelerating electrode means comprises a metallic grid positioned adjacent said silicon substrate and electrically coupled to said p-type silicon material.

4. Apparatus as defined in claim 1 and further comprising:

focusing means for focusing said increased number of said electrons into an electron beam, said focusing means being positioned between said microchannel plate multiplier and said silicon substrate.

5. Apparatus as defined in claims 4 wherein said focusing means include metallic electrodes positioned within said chamber.

* * * * *